United States Patent [19]

Thibault

[11] Patent Number: 4,933,988
[45] Date of Patent: Jun. 12, 1990

[54] AUDIO RECEIVER AND DETACHABLE BATTERY PACK

[76] Inventor: Gerard J. Thibault, 306 Stratas Court, Kanata, Ontario, K2L 3K5, Canada

[21] Appl. No.: 108,701

[22] Filed: Oct. 15, 1987

[51] Int. Cl.⁵ .......................... H04B 1/08; H04B 7/00
[52] U.S. Cl. .................................. 455/349; 455/348; 455/57; 381/77
[58] Field of Search ............... 455/343, 344, 347, 348, 455/349, 351, 57; 381/77, 78, 82, 85, 87, 88

[56] References Cited

U.S. PATENT DOCUMENTS

| | | | |
|---|---|---|---|
| 2,979,607 | 4/1961 | Herzfeld | 381/78 X |
| 3,035,168 | 5/1962 | Housman | 455/343 |
| 3,179,891 | 4/1965 | Sharma | 455/351 |
| 3,315,375 | 4/1967 | Heinz | 381/77 X |
| 3,462,688 | 8/1969 | Abel | 381/77 X |
| 3,637,940 | 1/1972 | Morchand et al. | 381/77 X |
| 3,796,984 | 3/1974 | Selinko | 455/349 |
| 3,824,472 | 7/1974 | Engel et al. | 455/344 |
| 4,027,248 | 5/1977 | Muzyka | 381/78 X |
| 4,352,200 | 9/1982 | Oxman | 455/6 |
| 4,685,133 | 8/1987 | Iggulden | 381/77 X |

FOREIGN PATENT DOCUMENTS 1157382 11/1983 Canada .

OTHER PUBLICATIONS

"Mura Hi Stepper" publication.

*Primary Examiner*—Benedict V. Safourek
*Assistant Examiner*—Ralph Smith
*Attorney, Agent, or Firm*—Arnold, White & Durkee

[57] ABSTRACT

Disclosed is equipment for wireless transmitting and receiving audio signals in a confined area which comprises a transmitter receiver and battery pack. The receiver including a bracket with which the receiver may be detachably secured to a surface such as a table or chair arm and whereby access to the fasteners with which the bracket means is secured to the surface is restricted. The receiver and battery pack have complementary dovetail means by which the battery pack and the receiver may be operatively secured together in electrical communication, the battery pack being detachable by the use of the receiver. Preferably, the bracket and receiver have a latchable dovetail connection means whereby the receiver can be hooked to the bracket and removed only by authorized people using an appropriate key. The transmitter is connected to a TV or video presentation machine such that it transmits the audio portion of the presentation over a selected FM frequency to the receiver or receiver in a bar, lounge or classroom. The receivers can be tuned into the selected frequency and head with appropriate earphones associated with the receiver. The receiver is only turned on when the battery pack and earphones are operatively connected with the receiver.

9 Claims, 3 Drawing Sheets

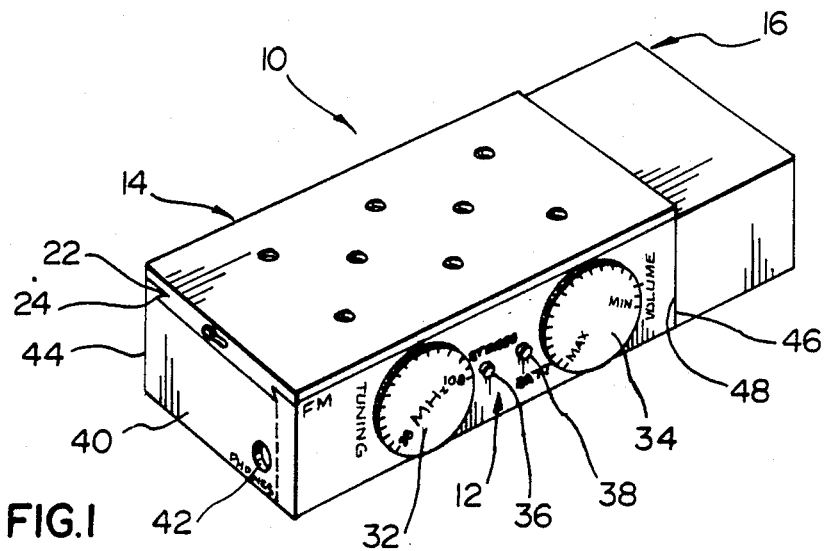
FIG. 1
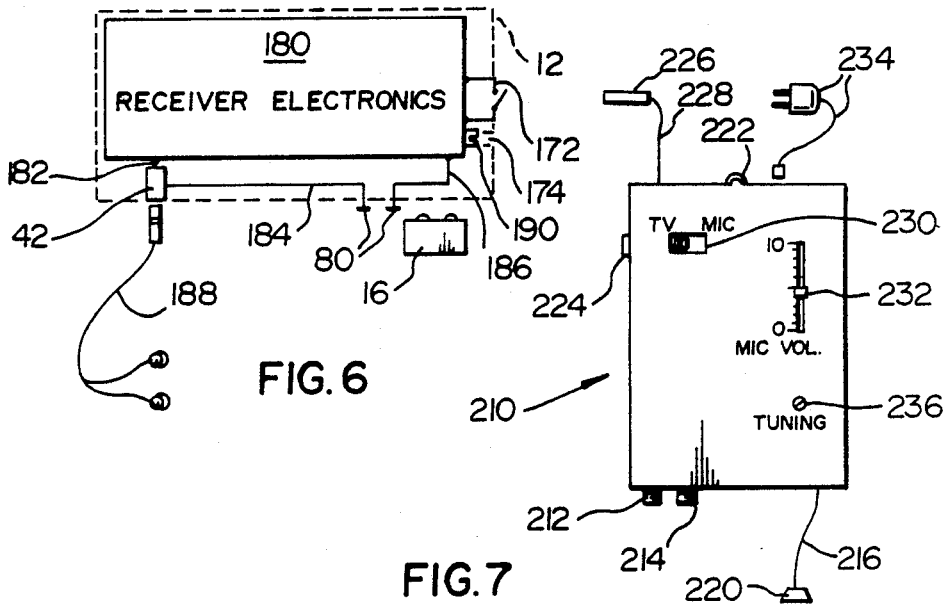
FIG. 6
FIG. 7

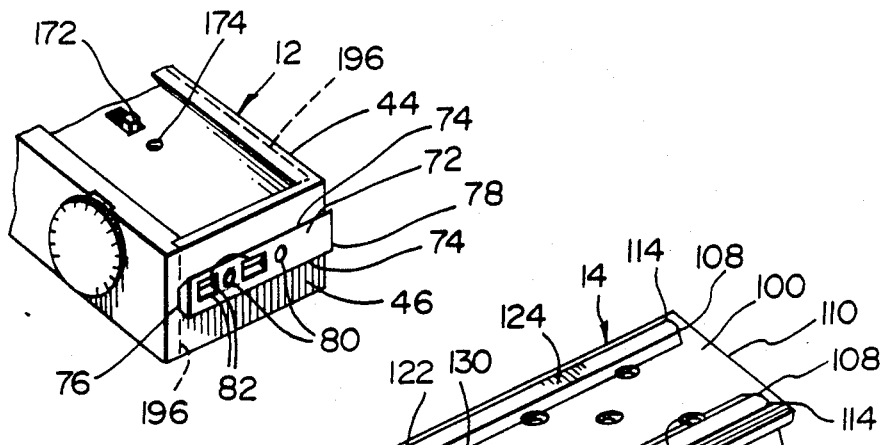
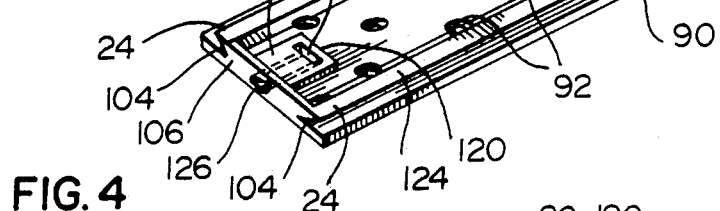
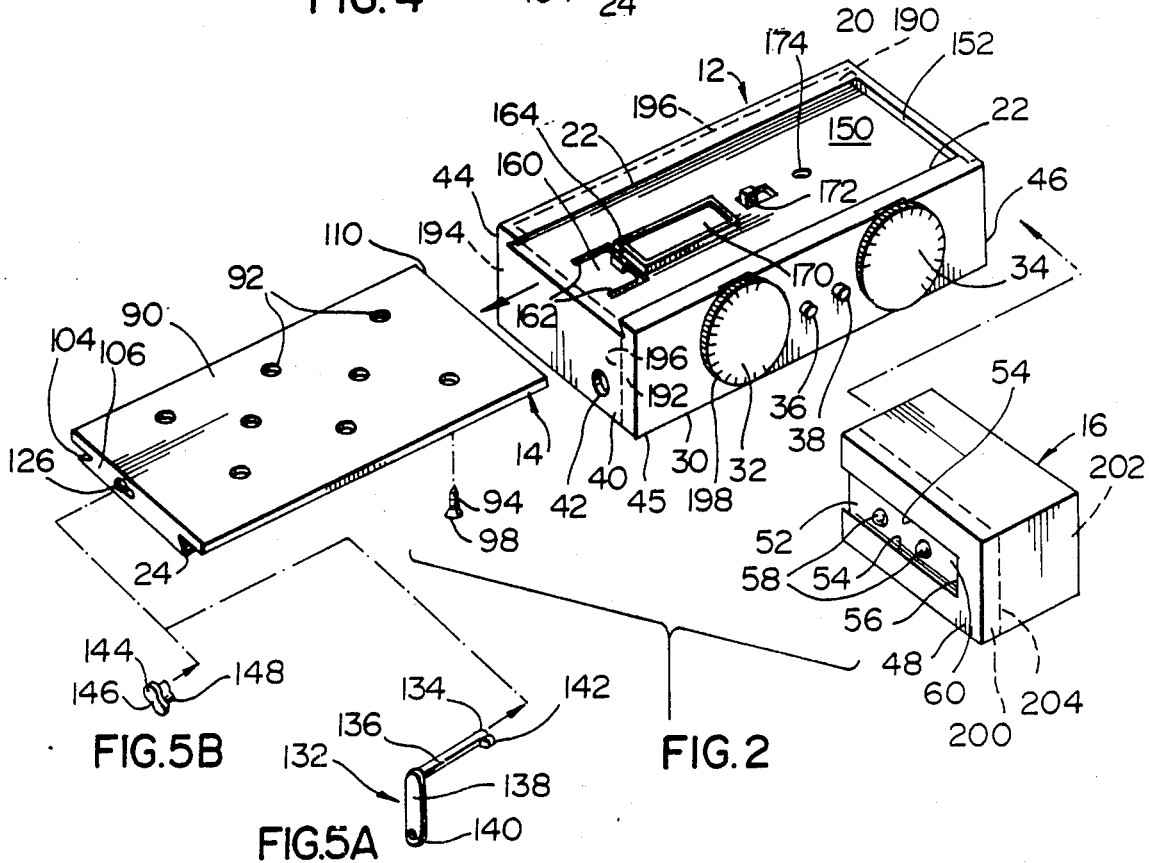

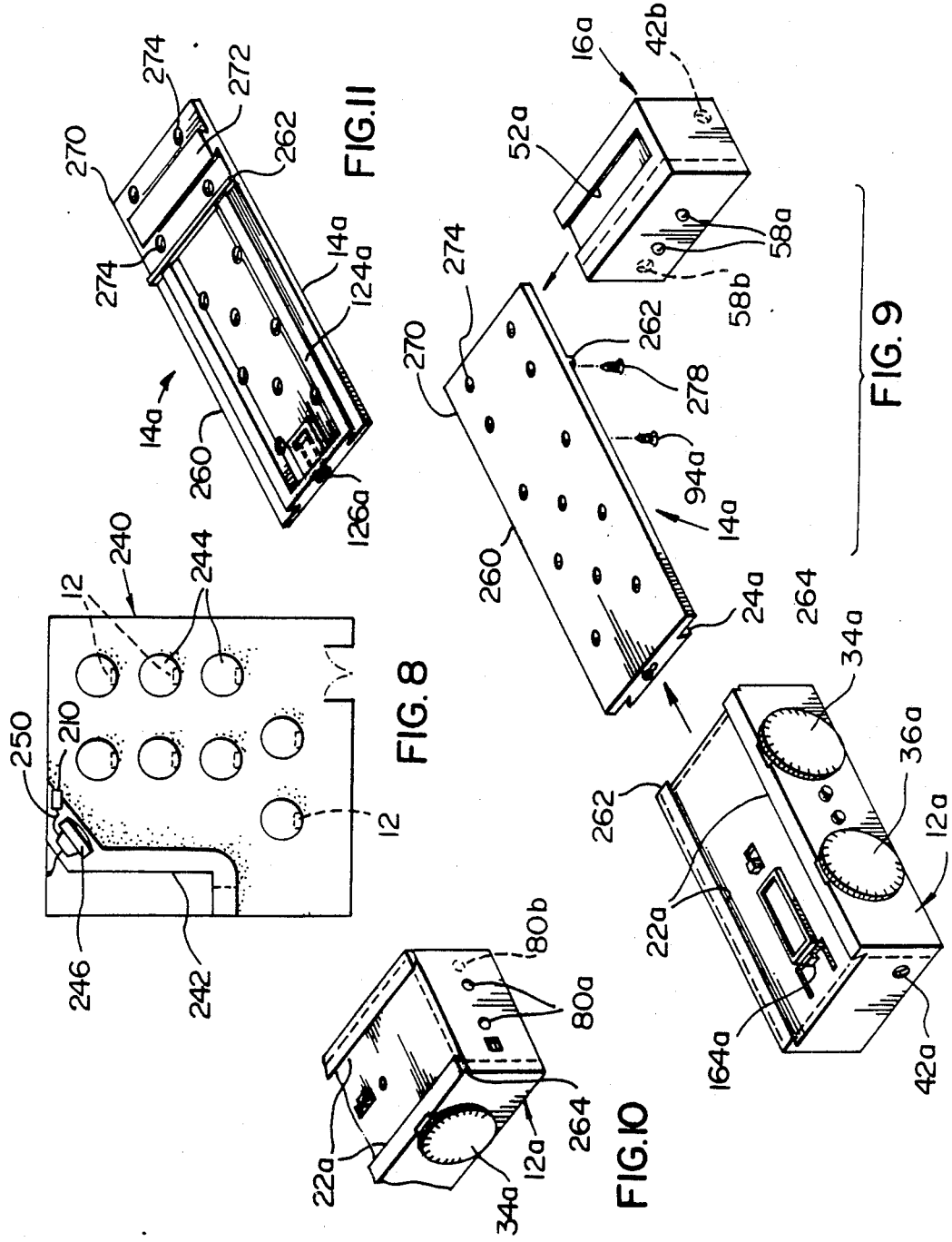

AUDIO RECEIVER AND DETACHABLE BATTERY PACK

FIELD OF INVENTION

This invention pertains to an audio receiver apparatus which includes a mounting device adapted to mount a receiver or tuner to a surface, and a battery pack detachably mounted in association with the receiver. An appropriate earphone jack is associated with the apparatus.

BACKGROUND OF THE INVENTION

Significant developments have been made in recent years in high fidelity audio equipment particularly as a result of developments in micro-circuitry which has enabled such equipment to be manufactured in very portable sizes at reasonable costs. The availability and marketing of devices such as the SONY WALKMAN TM attests to such developments. Miniaturization of circuitry and the resultant reduction in power drain has enhanced the utility of portable, battery powered high fidelity equipment, particularly those without built in speakers and which use only headphones or earphones.

Significant developments have also taken place in video equipment and although they have been commonly found in the past in bars and lounges, such equipment is becoming even more popular, particularly in view of the larger screens now available. Nevertheless, problems have arisen and continue to arise with respect to not only the agreed selection of TV channels in the bar or lounge but also, and often more importantly, with an agreed level of sound associated with the TV channel selected. Other than perhaps when major sports events are shown on a TV in bars or lounges—when the majority of patrons are prepared to watch the event with the volume at an appropriate level for most patrons—there are many, if not a majority of, times when only a few patrons may wish to watch TV in the bar or lounge. In such case, the level of the sound must be kept to a minimum to avoid undue annoyances to other patrons and the low level detracts from the enjoyment of those who do wish to watch TV. Some patrons may prefer to listen to the radio in such establishments while the TV is on. Moreover, TV sound conflicts with regular music broadcast over PA systems in establishments.

Further, many theatres, lecture halls and class rooms have been equipped with facilities or equipment with which simultaneous translations may be effected or with which talks may be amplified through the use of a microphone. Such facilities include earphones which may be plugged into appropriate jacks fixed in place in association with the seats or the like. Other such facilities provide portable receivers with earphones wherein the audio is broadcast by localized loop transmission. Such systems however are relatively expensive and would not be appropriate for use in the bars or lounge environment.

With the advent of VCR technology, buses and trains can easily include VCR movies on long trips, a screen or the like being pivotable outwardly into a central angle from the overhead baggage compartments. However, there is a problem with the audio portion of the presentation, similar to the problem outlined above with respect to bars and lounges.

Indeed, in the broader aspects, any areas in which people gather, such as waiting rooms in train stations, airports and bus stations or lounges in Senior Citizen homes, correctional facilities and the like, a centralized TV or VCR presentation would be beneficial except for the problem of the audio portion of the presentation.

Accordingly, it is desirable to provide a simple receiver device used with appropriate transmitting equipment, which permits people to individualize their listening to TV programs, radio, lectures, or the like in bars, lounges, theatres, halls, classrooms and waiting rooms.

Further, classroom education is stimulated to-day through the use of VCR's to show special programming. This would be enhanced if the audio is transmitted to such a receiving device and the listener is able to hear not only the audio of the program but other comments simultaneously. The speaker may wish to also pause programming and summarize programmed intervals. Moreover, it would also be advantageous to be able to receive two sources on one channel in gathering areas noted above, such as bars, waiting rooms, Senior Citizen homes and correctional facilities.

SUMMARY OF THE INVENTION

My invention relates to the provision of an audio system including a receiver or tuner apparatus preferably FM wave receptive which is relatively inexpensive and may be mounted on any convenient surface such as walls or tables in a particular location. Such receivers or tuners are capable of receiving and tuning into various audio signals such as radio signals. With an appropriate FM transmitter attached to a VTR television set, the audio portion of a TV or VCR program can be transmitted over FM waves to the receivers at an appropriate frequency and selectively tuned in. The receiver is preferably detachably mounted to an appropriate surface and a demountable battery pack. An earphone jack is associated with the apparatus.

The invention in one broad aspect pertains to apparatus for receiving wireless transmitted audio signals including housing means for a receiver of such signals and means for housing batteries. There is means by which the receiver housing means can be detachably secured to a surface and the receiver housing means and battery housing means each have means by which the battery housing means can be manually detachably associated with the receiver housing means whereby batteries in the battery housing means are in electrical communication with circuitry in the receiver housing means.

The invention also comprehends a battery pack for a receiver of audio signals which receiver has means whereby the receiver is securable to a surface, comprising battery housing means adapted to contain at least one battery. The housing means includes means for detachably associating the battery pack with a receiver when the receiver is secured to a surface, and contact means are associated with the exterior of the housing and are adapted to provide electrical communication with power contacts of the receiver.

Still another aspect of the invention pertains to a system for transmitting and receiving audio signals from video presentation means at at least one location comprising transmitter means for electrical connection between a source of incoming signals and the presentation means, the transmitter adapted for wirelessly transmitting the audio signals to the location on a predetermined frequency. Receiver means is at each location, the receiver means including means by which the receiver can be detachably associated with a surface at the location whereby unauthorized removal of the receiver is restricted. Means is associated with the receiver means whereby a battery can be detachably connected into circuitry in the receiver.

Preferably there is a battery pack containing at least one battery, the battery pack and receiver means having dovetail means for detachable, operative connection therebetween. The system also preferably includes earphone means, the receiver means having earphone jack means for the earphone means including circuitry whereby operative connection of both the earphone means and battery pack means is required for operation of the receiver means.

In use, the receiver apparatus would be mounted at desks or tables in a bar, lounge or classroom, so that patrons or students at the table or desk could selectively tune into the sound of a TV program, VCR presentation or an FM radio station at the user's desired volume level. The selectively mountable—demountable battery pack and earphones would be available for sale separately, preferably by the owner of the establishment when the receiver apparatus is present. The apparatus has an earphone jack for earphones which may be purchased with the battery pack as part of a package or separate at a reasonable price. The earphones could however be purchased separately.

Although optional, the inclusion of an earphone jack in the battery pack lessens the temptation of some patrons to misuse or intentionally damage the receiver or tuner by inserting non-compatible articles into the jack. The earphones and battery pack would be the property of the user after purchase, not the property or the proprietor of the establishment and could be reused by the purchaser as many times as he wished either in the same establishment or in another establishment having similar, compatible receivers.

The receiver is as tamper-proof as possible whereby only authorized personnel can service or repair the receiver. Accordingly, a distributor of the equipment would be the sole proprietor of the key operatively associated with releasing or securing the receiver to a bracket securely mounted to a surface.

Other aspects of the invention will become apparent from the preferred embodiment set out hereinafter.

BRIEF DESCRIPTION OF THE DRAWINGS

FIG. 1 is a perspective view of an FM stereophonic receiver apparatus showing the means for mounting the device and the battery pack.

FIG. 2 is a front perspective view from above showing separated, the receiver, the mounting plate and the battery pack.

FIG. 3 is a part perspective view from above of the receiver looking at the end to which the battery pack is mounted.

FIG. 4 is a perspective view of the mounting plate turned over from that seen in FIG. 3.

FIG. 5 (made up of FIGS. 5A and 5B) is a front perspective view of the keyhole plug (FIG. 5A) and the key (FIG. 5B) for separating the receiver from the mounting plate.

FIG. 6 is a schematic diagram of the switch electronics associated with the invention.

FIG. 7 is a top schematic view of a transmitter.

FIG. 8 is a schematic view of a bar or lounge wherein the invention may be used.

FIGS. 9, 10 and 11 are views similar to FIGS. 2, 3, and 4 showing modified embodiments.

DESCRIPTION OF PREFERRED EMBODIMENT

FIG. 1 shows, in perspective view, the overall apparatus 10 which includes receiver 12 operatively associated with mounting bracket 14 and battery pack 16. FIG. 2 is an exploded perspective view of receiver 12 separated from bracket 14 and battery pack 16.

Generally, rectangular receiver 12 includes an upper surface 20 having projecting dovetail side edges 22 adapted for cooperative association with dovetail projections 24 extending from bottom surface 26 of mounting bracket 14. Receiver 12 has front surface 30 with tuning control 32, volume control 34, stereo indicator light 36 and battery check light 38. Left side receiver surface 40 has an earphone jack aperture 42. Back surface 44 and bottom surface 45 of receiver 12 are flat.

The right side of receiver 12, as seen in FIG. 1, includes side surface 46 which is in juxtaposition to side surface 48 of battery pack 16. Surfaces 46 and 48, as seen in FIGS. 2 and 3, include dovetail projection 50 and dovetail groove or recess 52 respectively which are adapted for sliding cooperation. More particularly, referring to FIGS. 2 and 3, dovetail groove 52 includes opposed sides 54 and a flat end 56. Spaced contact members 58, which are in the form of spring biased rounded tipped elements, protrude from the plane of the floor 60 of groove 52. Dovetail projection 50 of receiver 12 is complementary in shape and size to groove 52 and has outer face 72, longitudinal side edges 74 and opposed flat ends 76 and 78, end 78 being planar with the back 44 of receiver 12.

Spaced contact members 80, having an outer face generally planar with dovetail projection face 72, are located for operative contact with members 58 of battery pack 16 when battery pack 16 is in operative association with receiver 12. Indentations 82 on face 72 into which the rounded tip of spring biased contacts 58 move when battery 16 is being assembled with receiver 12, provide for positive "feel" connection and limit unintentional total separation of the battery pack from the receiver without positive manual separation. However, it will be appreciated that such indentations are optional.

Mounting bracket 14, as shown in FIGS. 2 and 4, has an outer surface 90 and a plurality of mounting holes 92 for accommodating appropriate screw fastener means 94 (only one shown) so that bracket 14 may be mounted to a flat surface such as the underside of a table or bench, or to a wall. Holes 92 have countersunk surfaces 96 as more fully shown in FIG. 4, the countersink such that the head 98 of fastener screw 94 is substantially flush with inner surface 100 of bracket.

Longitudinal dovetail projections 24 extend from inner surface 100 and have ends 104 generally planar with bracket end face 106 and ends 108 which are spaced from end face 110. Ends 108 of dovetail projections 24 are slanted inwardly slightly at 114 to facilitate easier matching of the dovetails in assembly of bracket 14 and receiver 12.

Extending longitudinally inwardly from face 106 is keyway housing 120 having upper surface 122 generally planar with the upper surface 124 of dovetail projections 24. Keyway 126 extends from face 106 inwardly to rectangular opening 130 which communicates between keyway 126 and upper surface 122. Keyway 126 is sized and shaped to accept key 132 shown in FIG. 5A.

Key 132 includes key end 134, shank 136 and handle 138 with aperture 140 adjacent the free end thereof, the shape of key end 134 and keyway 126 being complementary such that key end 134 may be inserted into keyway 126 and rotated by handle 138 such that key end projection 142 extends upwardly through opening 130 to release a latch mechanism to be described more fully herein. Any shape of key/keyway is possible but should be of a shape which is not common and preferably unique to make it more difficult for objects such as bent hairpins or the like to be used to unlock the receiver from a mounted bracket 14. Keyway plug 144 (FIG. 5B) has flange portion 146 larger than keyway 126 and plug portion 148. Plug portion 148 tightly fits keyway 126 so that plug 144 is difficult to remove by hand or without proper tools.

Returning to FIG. 2, the upper surface 20 of receiver 12 has a recess 150 defined by longitudinally extending dovetail side edges 22 along the front and back thereof and end wall 152, the spacing between ends 108 of dovetail projections 24 and end face 110 of bracket 14 being complementary with the thickness of wall 152.

An inverted "U" shaped latch flange 160 is provided in top 150, flange 160 being defined on three sides by aperture 162 thereby providing flexibility to flange 160. Projecting upwardly from flange 160 is latch member 164 which is adapted to project into opening 130 in bracket 14 when the receiver 12 and bracket are in operative association. Key projection 142 is adapted to depress member 164 and separate it from opening 130 so that the receiver 12 may be slidably removed from bracket 14.

Longitudinally adjacent flange 160 is removably covered rectangular opening 170 which permits entry into the receiver for factory tuning and repairs as may be necessary. Further, switch 172 is operatively associated with the electronic circuitry of the receiver such that the receiver can be locked into a specific chosen FM band or channel as may be desired when the receiver is used in a bar, lounge, classroom or the like in association with the transmittal of the audio portion or presentation. The receiver may be locked into the particular band by the installing service technician. Otherwise the receiver 12 operates as an ordinary FM radio receiver.

Opening 174 is also an opening for service and in particular provides access to the appropriate electronic means so as to choose the channel into which the receiver is locked by switch 172. It will be appreciated that when receiver 12 is in locked operative association with bracket 14, access to opening 170, switch 172 and opening 174 is prohibited.

Applicant does not claim, as part of his invention, any particular manner of manufacture of the receiver and battery pack casings nor does he claim any detailed aspects of the electronic or electrical aspects of receiver and battery pack. FIG. 6 however, does illustrate schematically a circuit diagram simply to illustrate that the preferred electronics includes a dual on/off switch control for the receiver. More particularly, it is desired that the receiver not be turned on until both the earphones and the battery pack are in operative position. If one or the other is not in place, the receiver is not turned on. Block 180 represents the electronic/electrical aspects of the receiver and associated therewith are contacts 80 and earphone jack 42. Jack 42 is connected with the electronics of block 180 through conductor 182 and connected to one battery contact 80 by conductor 184, the other contact 80 being connected to the electronics of block 180 through conductor 186. It will be appreciated that until both earphones 182 and battery pack 16 are in operative association, receiver 12 is not turned "on". Further it will be appreciated that appropriate antennae means is incorporated into the system and may either be part of the receiver electronics 180 or part of the earphones 188. In the later case, the schematics of earphone jack would include additional contact means to provide operative connection of the antennae contacts as well as the audio connections. Also shown in FIG. 6 is switch 172, opening 174 and slotted element 190, the rotation of which is by a suitable tool such as a small flat headed non-metallic (e.g. plastic) screw driver (not shown), permitting the selection of a specific channel within the FM band width on which an audio signal is to be specifically received. Switch 172 locks the receiver onto the selected channel so that no other channel is received regardless of movement of tuning dial 32. This is particularly useful when the receiver is to be used in classrooms or the like areas where one does not wish listeners to listen to other than one channel. With switch 172 in an unlocked position, receiver 12 is used simply as an FM radio receiver, one or more channels of which are adapted to receive selected audio as noted below. The electronics and electrical circuitry to achieve the above is known and not within the contemplation of the invention other than as set forth herein.

The casing for receiver 12 may be molded of two parts (190, 192 with dotted lead lines), one part 192 including the front 30, top 20 with dovetail edges 22 and bottom 45, and a second part 194 including sides 40 and 46 (including dovetail projection 50) and back 44. Dotted line 196 in FIGS. 2 and 3 illustrates the joint line between the two parts which parts may be chemically or ultrasonically welded together when all the electronics and electrical aspects have been operatively connected. Preferably the edges of tuning dials 32 and 34 are recessed slightly within socket 196 in front 30 in order to make it more difficult for destruction of the receiver by someone attempting to pry off the dials. The dials 32 and 34 are fastened to the appropriate inner elements of the tuning and volume mechanisms by screws through the center of the dials. The screw heads are covered by plastic discs glued to the dial faces, the markers having the dial markings thereon.

With respect to battery pack 16, it may be fabricated in two parts 200 and 202 with dotted lead lines, dotted line 204 showing a weld line between the parts. Parts 200 may be molded to contain appropriate disc batteries (not shown) or the like and part 202 fabricated with spring biased pins (not shown) having contact ends 58, the other ends of which are adapted to contact the batteries. The battery pack parts 200, 202 are appropriately chemically or ultrasonically welded together to provide a sealed unit. Obviously various modifications in the construction of the parts for assembly of the receiver as a unit and the battery pack as a unit are possible. For example, the battery pack could be fabricated for replacement alkaline batteries or include appropriate contacts whereby rechargeable batteries could be recharged. The object in constructing the receiver is to produce one which is as tamper-proof as possible within a cost effective approach, taking into consideration, the expected environment in which the receiver is likely to be used.

FIG. 7 schematically illustrates a transmitter 210, the internal electrical/electronic controls of which are not part of the invention. However, the transmitter 210 includes coaxial cable input 212 and cable connection 214 to a TV (or VCR). Antenna wire 216 extends from the transmitter for transmitting FM signals to receiver(s) 12, knob 220 acting as a small weight since transmitter 210 can be hung adjacent a TV or VCR by hook 222. Transmitter 210 further includes on/off switch 224, shown on one side and may also include a battery check light (not shown). Microphone 226 is connected through wire 228 into the circuitry of the transmitter such that switch 230 moveable from a "TV" position to a "MIC" position can selectively permit someone to use the system as a microphone sound system cutting off transmittal of the audio of the "TV" or VCR presentation. The volume of the microphone pick up is controlled by sliding control 232.

With appropriate circuitry, it will be appreciated that rather than simply switching off the audio portion of a TV by switch 230, the audio portion could continue and switch 230 simply including microphone 222 into appropriate circuitry whereby volume control 232 can control a volume override of the audio portion of the TV or VCR presentation. This type of system is effective to allow announcements over the system such as paging, or telephone call announcements without having to switch off completely the audio of TV or VCR presentation. It will also be appreciated that such a system can be used in classrooms or lecture halls where the microphone would be effectively used to selectively override the audio pick up of the visual presentation and allow simultaneous comments or the like.

Transmitter 210 may be battery operated and/or provided with a connection (not shown) for accepting a dc adapter 234. Opening 236 is an opening similar to opening 174 on receiver 12 which permits tuning of the transmitter by an installing technician to a selected frequency for transmittal of sound to the receiver(s) 12.

The receiver 12, bracket 14, battery pack 16 and the transmitter 210 may be made of any suitable strong material. Strong plastic material like ABS plastic is preferred for its strength/weight advantage and ease of molding.

In use, a bar or lounge 240 as schematically illustrated in FIG. 8, has bar 242, various tables 244 and TV 246. To each table 244, preferably to the underside thereof adjacent the side edge, is secured a bracket 14 by means of screws 94 so that dovetail projections 24 extend downwardly or outwardly from the table. Receiver 12 with all electrical and electronic equipment contained therein for receiving FM signals of appropriate frequency, is dovetail assembled with bracket 14, with projection 164 on the receiver, snaping into opening 130 of bracket 14 to lock the receiver to the bracket 14. Receiver 12 is thus securely mounted to an appropriate surface in a manner whereby it is difficult to remove and screws 94 are hidden. Receiver 12 can only be removed with special key 132 by inserting key end 134 into slot 126 and rotating it so as to bring projection 142 into contact with latch projection 164 and to depress it such as to remove latch 164 from opening or hole 130 and permit the receiver 12 to be slid relative to the bracket 14. When the receiver is installed, plug 144 is inserted in place with plug portion 148 inserted within keyway slot 126 and flange portion 146 providing means by which the plug may be removed by appropriate tools such as a thin nosed screwdriver.

The wireless FM transmitter 210 is located near the TV 246 and the TV converter cable (not shown) (or VCR cable) is connected to input 212 of transmitter 210, a coaxial cable 250 is connected between TV 246 and output 214. Transmitter 210, operating on batteries or dc adapter 234, is then tuned by using a non-metallic (plastic) screwdriver-like device (not shown) inserted into opening 236, transmitter 210 being tuned to a dead spot on the FM band of receiver 12 (i.e. a channel on which no FM radio broadcasts in the area are received).

Once the transmitter 210 is tuned, receiver 12 will receive the audio portion of the TV (or VCR) on the selected channel. A patron of the bar can tune the receiver (dial 32) into the selected channel in order to hear the TV or tune into any local FM broadcasts. It will be appreciated that in some establishments more than one TV (or VCR) could be employed with various receivers providing appropriate reception of the various audio portions of the programs. The transmittal associated with each TV (or VCR) would transmit on a different pre-selected FM dead spot channel and the particular receivers located for use with such transmitters appropriately "tuned in" to that frequency. The normal FM radio broadcasts are not affected.

However in a classroom or educational environment, it may be desirable to lock the receiver into the selected transmitting channel so that other FM reception is eliminated. The installer or other technician can do this by removing the receiver 12 from bracket 14, tuning the receiver onto the selected channel by use of a non-metallic tool inserted into opening and rotating element 186 and then locking the receiver onto that selected channel by switch 172. Thereafter rotation of tuning dial 32 does not have any effect and Transmit volume is not controlled except for use of the microphone volume which is adjustable. The volume for the audio transmission/reception is controlled by the receiver 12. Transmitter 210 on the system may have a splitter (not shown) so that the TV can be operated by itself without the necessity of disconnecting o re-connecting cables to the transmitter 210.

Management of the establishment may sell the earphones and battery packs together or separately for nominal charges. Once the battery pack and earphones have been purchased, patrons are free to utilize them as many times as they wish in any one of various receivers installed or associated with furniture in the establishment or other establishments with like receiving equipment. Once earphones have been secured, battery packs can be purchased as required. When the batteries are dead, the pack is appropriately disposed of.

Alternatively, battery pack 16 can be constructed wherein the batteries therein, e.g. disc or "button" batteries, are replaceable. Still further, battery pack 16 could have rechargeable batteries so that home charges by the patron or consumer is possible. For classroom use, a master recharger module to which several battery packs could be connected, could be used to recharge the battery packs overnight.

FIGS. 9, 10 and 11 are views similar to the embodiment shown in FIGS. 2, 3 and 4 but modified wherein the battery pack 16a is detachably secured to the bracket 14a rather than the receiver 12a but such to provide appropriate electrical contact between battery pack 16a and receiver 12a.

More particularly, it will be seen that receiver 12a, otherwise the same as receiver 12, does not have end wall 152 so that receiver 12a may be dovetailed with portion 260 of bracket 14a in the direction of the arrow. Bracket 14a has transverse flange 262 against which recessed end portions 264 and 266 of receiver 12a abut.

Bracket 14a has an extended portion 270 having dovetail projection 272, portion 270 having apertures 274 through which fasteners (screws) 278 may extend in order that portion 270 also is firmly secured to an appropriate surface. Apertures 274 are countersunk so that the heads of fasteners do not interfere with desired dovetail connections.

Battery pack 16a has contacts 58a on the side but the dovetail recess or grooves 52a are on the top for complementary association with bracket projection 272.

It will be appreciated that the nature of the dovetail projection 272 and groove 52a is such that appropriate electrical contact between contacts 58a of battery pack 16a and contacts 80a of receiver 12a is made. The receiver 12a is locked into dovetailed association with portion 260 of bracket 14 in a manner similar to receiver 12 in bracket 14 in the embodiment of FIGS. 2, 3 and 4.

The embodiment of FIGS. 9, 10 and 11 illustrates that other means of detachably securing battery pack 16a in operative association with receiver 12a and bracket 14a are contemplated by the invention.

Various other modifications of the invention will be apparent to those skilled in the art. For example, earphone jack 42 (42a) may be incorporated in the battery pack 16 (16a) such as shown in dotted lines 42b in which case it will be appreciated that additional electrical connections shown in dotted lines 58b and 80b between the battery pack and receiver 12 (12a) (as part of the dovetail connection) would be required. In such embodiment, any tendency of people intentionally sticking foreign objects into jack 42 and damaging the receiver would be significantly lessened if not removed entirely. As part of the battery pack carried by a user, the earphone jack is not likely to be intentionally damaged. However, it will be apparent that a battery pack with an earphone jack therewith would be more expensive to produce and sell. Accordingly, with such embodiment, there could be a battery pack with an appropriately latched door wherein the batteries would be replaceable in order to make the pack more cost effective for the consumer. The alternative would be to provide a battery pack wherein the batteries are rechargeable.

Other modifications are also possible. For example, the receiver 12 could be secured to bracket 14 by screw fastener means (not shown) which are deeply recessed in holes (not shown) in the receiver housing and which fastener means have a uniquely designed head having means complementary to the head of an appropriate tool (not shown) to restrict unauthorized removal of the receiver.

It will also be appreciated that in locations where there may be little likelihood of tampering, such as in a lecture hall, the receiver could be designed to be directly secured by visible fastening means to the appropriate surface, with only the battery readily detachable from the receiver. No separate bracket would be necessary.

Indeed it will be appreciated that the receiver could be incorporated within a recess in the edge of a table or in an armrest of a chair or seat with only the appropriate tuning dials, earphone jack and means for detachably connecting the battery pack to the receiver accessible to a user. The term "surface" to which the receiver is secured is to be interpreted broadly to include any surface to which the receiver is secured or associated. Alternatively, the receiver housing could include an integral bracket or have a recess capable of removably containing batteries in electrical contact with circuitry of the receiver.

Accordingly, although applicant has set forth a preferred embodiment and various modifications thereof, it will be apparent that various other modifications are possible and applicant claims all such modifications that fall within the appended claims.

The embodiments of the invention in which an exclusive property or privilege is claimed are defined as follows:

1. An audio system, comprising:
   an audio-video signal source;
   a video display medium operatively coupled to said audio-video signal source to enable the display of the video portion of said audio-video signal;
   an audio transmitter operatively coupled to said audio-video signal source and adapted to transmit said audio portion of said signal at a desired frequency; and
   a plurality of audio receiving assemblies tunable to said desired frequency to receive said audio signal from said audio transmitter, each audio receiving assembly comprising,
      a first module including receiving circuitry;
      a second module including a battery pack;
      a mounting plate for cooperatively holding both said first module and said second module in an operating relationship, said mounting plate and said first module engagable through cooperating parallel dovetail and groove sections;
   means for releasably securing said first module and said second module in operative relation with one another; and
   a latch mechanism serving to non-removably secure said receiver module to said mounting bracket, said latch mechanism comprising a latch recess in said bracket, and a complementary latch tongue associated with said first module, and wherein said bracket includes an aperture providing keyway access to said latch recess whereby a key may be inserted into said aperture to unlatch said latch tongue from said latch recess.

2. The system of claim 1, wherein said audio receiving assemblies comprise at least one earphone jack coupled to said receiving circuitry and a switch mechanism for enabling said receiving circuitry only when an earphone operatively engages said earphone jack.

3. The system of claim 1, wherein said means for releasably securing said first module and said second module in operative relation with one another comprises cooperating parallel dovetail and groove sections on said mounting plate and said second module.

4. The system of claim 1, wherein said means for releasably securing said first module and said second module in operative relation with one another comprises cooperating parallel dovetail and groove sections on said first module and said second module.

5. An audio distribution system, comprising: an audio signal source, providing an audio signal;
   an audio transmitter operatively coupled to said audio signal source and adapted to transmit said audio signal at a desired frequency; and
   a plurality of audio receiving assemblies tunable to said desired frequency to receive said audio signal from said audio transmitter, each audio receiving assembly comprising,
      a first module including receiving circuitry;
      a second module including a battery pack; and a mounting plate for cooperatively holding both said first module and said second module in an operating relationship, said mounting plate and said first module engagable through cooperating parallel dovetail and groove sections;

means for releasably securing said first module and said second module in operative relation with one another; and a latch mechanism serving to non-removably secure said receiver module to said mounting bracket, said latch mechanism comprising a latch recess in said bracket, and a complimentary latch tongue associated with said first module, and wherein said bracket includes an aperture providing keyway access to said latch recess whereby a key may be inserted into said aperture to unlatch said latch tongue from said latch recess.

6. The system of claim 5, wherein said audio receiving assemblies comprise at least one earphone jack coupled to said receiving circuitry and a switch mechanism for enabling said receiving circuitry only when an earphone operatively engages said earphone jack.

7. The system of claim 5, wherein said means for releasably securing said first module and said second module in operative relation with one another comprises cooperating parallel dovetail and groove sections on said mounting plate and said second module.

8. The audio-video system of claim 5, wherein said means for releasably securing said first module and said module in operative relation with one another comprises cooperating parallel dovetail and groove sections on said first module and said second module.

9. An audio system, comprising:

an audio-video signal source;

a video display medium operatively coupled to said audio-video signal source to enable the display of the video portion of said audio-video signal;

an audio transmitter operatively coupled to said audio-video signal source and adapted to transmit said audio portion of said signal at a desired frequency; and a plurality of audio receiving assemblies tunable to said desired frequency to receive said audio signal from said audio transmitter, each audio receiving assembly comprising, a first module including receiving circuitry;

a second module including a battery pack;

a mounting plate for holding said first module, said mounting plate and said first module engagable through cooperating parallel dovetail and groove sections; and means for releasably securing said first module and said second module in operative relation with one another;

a latch mechanism serving to non-removably secure said receiver module to said mounting bracket, said latch mechanism comprising a latch recess in said bracket, and a complementary latch tongue associated with said first module, and wherein said bracket includes an aperture providing keyway access to said latch recess whereby a key may be inserted into said aperture to unlatch said latch tongue from said latch recess.

* * * * *